F. H. TREAT.
MEANS FOR INDICATING THE DEFLATION OF PNEUMATIC TIRES.
APPLICATION FILED OCT. 7, 1911.
1,038,801.
Patented Sept. 17, 1912.
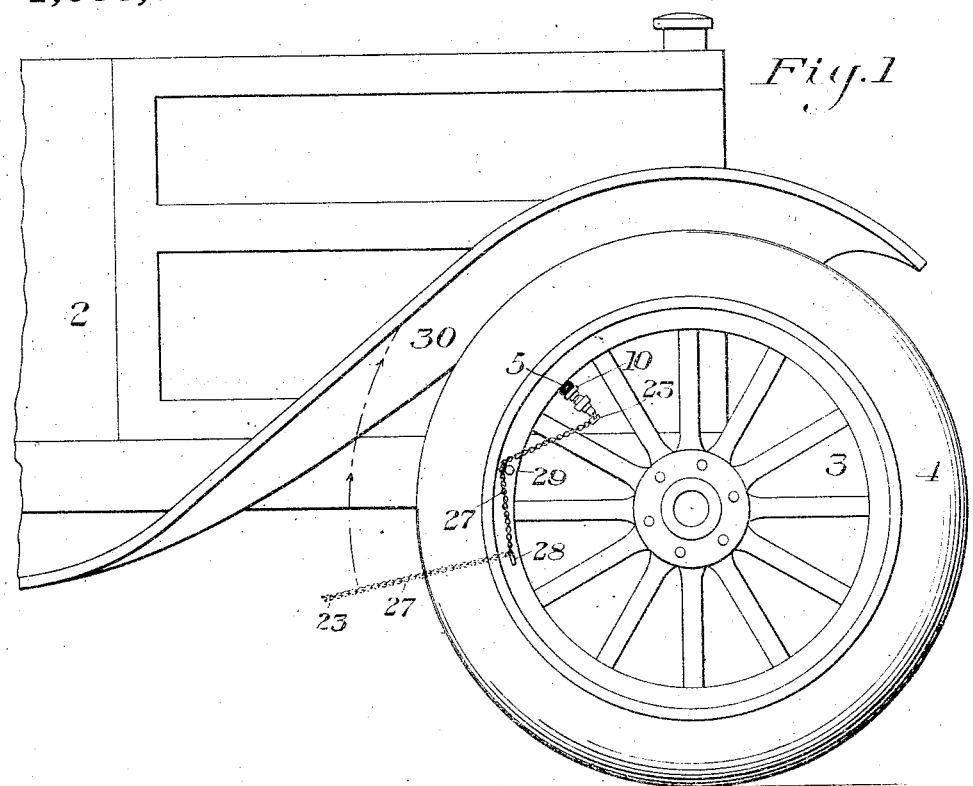
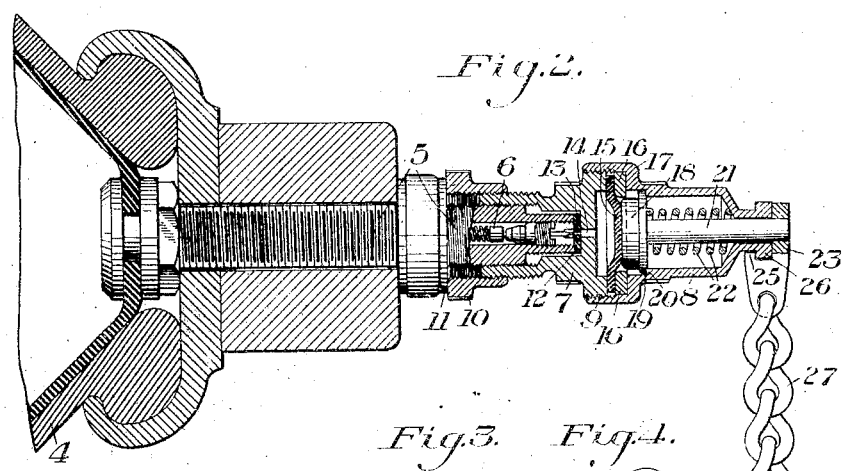
WITNESSES
INVENTOR

UNITED STATES PATENT OFFICE.

FRANCIS H. TREAT, OF CLEVELAND, OHIO.

MEANS FOR INDICATING THE DEFLATION OF PNEUMATIC TIRES.

1,038,801.   Specification of Letters Patent.   Patented Sept. 17, 1912.

Application filed October 7, 1911. Serial No. 653,306.

*To all whom it may concern:*

Be it known that I, FRANCIS H. TREAT, a resident of Cleveland, in the county of Cuyahoga and State of Ohio, have invented a new and useful Improvement in Means for Indicating the Deflation of Pneumatic Tires, of which the following is a full, clear, and exact description, reference being had to the accompanying drawings, forming part of this specification, in which—

Figure 1 is a side view of a portion of an automobile showing my invention applied to one of the wheels; Fig. 2 is a sectional view showing the valve tube of the tire and the cap attachment constituting my invention; and Figs. 3 and 4 are detail views of the locking member.

My invention has relation to means for indicating the deflation of pneumatic tires, and is designed to provide means of simple and inexpensive character which can be readily attached to the ordinary valve tubes of pneumatic tires and which will indicate either visibly or audibly or both when the tire has become deflated to an unsafe limit.

The nature of my invention will be best understood by reference to the accompanying drawing, in which I have shown the preferred embodiment thereof which will now be described, it being premised, however, that various changes may be made in the details of construction and arrangement of the parts, without departing from the spirit and scope of my invention as defined in the appended claims.

In these drawings, the numeral 2 designates a portion of an automobile, 3 one of the front wheels, and 4 the tire thereof.

5 designates the usual valve tube of the tire which is provided with the usual valve device 6, forming no part of the present invention.

My invention is in the nature of a cap which can be attached to the threaded exterior of the valve tube 5, in lieu of the ordinary cap. It comprises the two casing or cap members 7 and 8, which are united by a threaded joint at 9. The member 7 screws over the threaded end of the tube 5, and is secured by a lock nut 10, which preferably screws against the washer or packing ring 11, so as to render the joint watertight. The member 7 has a cavity therein, to receive the projecting end portion of the tube or nipple 5, a washer 12 being seated against the bottom wall of said cavity for contact with the stem of the valve device 6, so as to normally hold said valve open. This washer has a central opening 13, therethrough in line with a similar opening 14 in the wall against which it seats, so that air passing the valve 6 may flow through the registering openings 13 and 14 and to the under side of the flexible diaphragm 15, which is secured at its marginal portion between the upper end of the member 7 and an annular ring 16, which is seated within the flanged screw-threaded portion 17 of the member 8.

The numeral 18 designates a plunger having a portion of its head reduced in diameter to enter the opening in the ring 16, and contact with the opposite side of the diaphragm. This plunger is contained within the casing or cap member 8 and its movement is limited by the flange 19 thereon engaging the ring 16 in one direction and the shoulder 20 in the opposite direction. The stem portion 21 of the plunger extends outwardly through the end of the cap or casing member 8, a coil spring 22 being seated around said stem and bearing against the head at one end and against the interior end wall of the member 8 at the opposite end. This spring normally holds the plunger in contact with the diaphragm and resists the air pressure acting on the opposite side of the diaphragm.

23 designates a locking member having an arm provided with a perforation 24, which engages a projecting end of the stem 21. This locking member has a shorter arm 25 which engages underneath the flange 26 on the cap or casing member 8. Attached to the locking member is a chain or other flexible member 27, whose other end is attached to an eye 28, on the side of the wheel felly, being preferably passed around a pin 29, seated in said felly for the purpose of taking up slack and normally preventing rattling.

The operation is as follows: The spring 22 is given an initial tension, such that it can be overcome by the minimum of air pressure within the tire acting against the diaphragm. The diaphragm, therefore, presses the plunger outwardly so that its stem projects sufficiently to receive and retain the member 23. As soon, however, as the pressure falls to a sufficient degree to enable the spring to preponderate, the latter forces the plunger inwardly and withdraws the end of the plunger rod or stem from the perforation 24 of the locking member. This member is now loose, and as the wheel revolves, the chain 27 will strike the mud guard 30 of the vehicle and thereby indicate to the driver that a deflated condition of the tire exists. In cases of gradual deflation of the tire, the driver by watching the device can readily see when the end of the stem of the plunger retracts within the eye 24 of the locking member and can thus be warned in advance that the tire is approaching a condition of deflation sufficient to require inflating.

Inasmuch as the attachment comprising my invention can be readily applied to existing valve tubes, it forms a very simple, inexpensive and efficient means of indicating the deflated condition of the tire.

It will be obvious that the diaphragm and plunger can be made to operate various kinds of alarm devices, and that various other changes can be made in the details of construction and arrangement of the parts within the scope of my invention as claimed.

I claim:

1. Means for indicating the deflation of pneumatic tires comprising a member having means for its connection to the wheel of a vehicle and also to the valve tube of the tire of said wheel, and means for detaching said member at one end operated by the reduction of pressure within the tire, substantially as described.

2. Means for indicating the deflation of pneumatic tires comprising a flexible member having means for its connection to the wheel of a vehicle and also to the valve tube of the tire of said wheel, and means for detaching said member at one end operated by the reduction of pressure within the tire, substantially as described.

3. A device for indicating the deflation of pneumatic tires, comprising a cap having a threaded portion for attachment to the valve tube or nipple of a tire and also having means for normally holding the tire valve open, a diaphragm contained in the cap or casing and subject to the internal pressure of the tire upon one side, a plunger seated against the opposite side of the diaphragm, a spring acting on the plunger reversely to the diaphragm, and an alarm device having a normally locked engagement with said plunger to release by the inward movement thereof, substantially as described.

4. In a device for indicating the deflation of pneumatic tires, a cap or casing adapted for attachment to the valve tube of a tire, a diaphragm, a plunger arranged to be actuated by the diaphragm, a locking member normally engaging the plunger, and a flexible connection between the locking member and the rim or felly of the wheel which carries the tire, substantially as described.

5. A device for indicating the deflation of pneumatic tires, comprising a flexible signal member having means for its connection to a wheel of a vehicle, and also to the valve tube of the tire of said wheel, and means for freeing said member operated by the reduction of pressure within the tire, substantially as described.

6. A device for indicating the deflation of pneumatic tires, comprising a cap having means whereby it may be permanently attached to the valve tube or nipple of a tire, and also having means for normally holding the tire valve open, said cap having a diaphragm seat, a flexible diaphragm, a clamping ring between which and the seat the edge portions of the diaphragm are held, said diaphragm forming a seal to prevent the escape of air from the tire beyond the diaphragm, a spring-pressed plunger bearing against the diaphragm, and means for limiting the movements of said plunger, together with an alarm device controlled by the said plunger, substantially as described.

7. A device for indicating the deflation of pneumatic tires, having a diaphragm chamber, a diaphragm therein, means for connecting the diaphragm chamber with the interior of a pneumatic tire, a plunger seated against the diaphragm and having a projecting stem, and a flexible alarm device engaging the projecting end of the stem and adapted to be released by the inward movement thereof, said alarm device, when released, being in a position to strike a relatively fixed portion of the vehicle, substantially as described.

8. A device for indicating the deflation of pneumatic tires, comprising a diaphragm chamber, a diaphragm therein, means for connecting the diaphragm chamber with the interior of a tire, a plunger seated against the diaphragm and having a projecting stem, the casing of the diaphragm chamber having a surrounding collar or flange, and a signal device arranged to engage the projecting end of the stem and also the collar or flange in different radial positions, substantially as described.

In testimony whereof, I have hereunto set my hand.

FRANCIS H. TREAT.

Witnesses:
A. F. TIBBETTS,
H. M. CORWIN.